(12) United States Patent
Kotake et al.

(10) Patent No.: US 11,287,275 B2
(45) Date of Patent: Mar. 29, 2022

(54) INFORMATION PROCESSING APPARATUS, INFORMATION PROCESSING METHOD, AND NON-TRANSIENT STORAGE MEDIUM

(71) Applicant: TOYOTA JIDOSHA KABUSHIKI KAISHA, Toyota (JP)

(72) Inventors: Kosuke Kotake, Nagoya (JP); Ryosuke Tanimura, Toyota (JP); Yuki Ito, Iwakura (JP); Akira Nishida, Toyota (JP); Zekai Qiu, Nisshin (JP); Kenichi Hagiya, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 16/459,662

(22) Filed: Jul. 2, 2019

(65) Prior Publication Data

US 2020/0003575 A1 Jan. 2, 2020

(30) Foreign Application Priority Data

Jul. 2, 2018 (JP) .............................. JP2018-126204

(51) Int. Cl.
*G01C 21/36* (2006.01)
*G01C 21/34* (2006.01)
*G08G 1/00* (2006.01)

(52) U.S. Cl.
CPC ..... *G01C 21/3605* (2013.01); *G01C 21/3438* (2013.01); *G08G 1/205* (2013.01)

(58) Field of Classification Search
CPC ......................... G01C 21/00; G01C 21/3605; G01C 21/3438; G08G 1/00; G08G 1/13; G08G 1/205; G06Q 50/00; G06Q 50/10; G06Q 30/00
See application file for complete search history.

(56) References Cited

U.S. PATENT DOCUMENTS

| 2013/0080196 A1* | 3/2013 | Schroeder .............. G06Q 50/30 705/5 |
| 2016/0292596 A1 | 10/2016 | Gaitan et al. |
| 2019/0072398 A1* | 3/2019 | Balakrishna ....... G01C 21/3492 |
| 2019/0385265 A1* | 12/2019 | Liu ....................... H04W 4/029 |

FOREIGN PATENT DOCUMENTS

| JP | 2010-204708 A | 9/2010 |
| JP | 2011-237842 A | 11/2011 |
| JP | 2018-077658 A | 5/2018 |

\* cited by examiner

*Primary Examiner* — Jess Whittington
*Assistant Examiner* — Terry C Buse
(74) *Attorney, Agent, or Firm* — Oliff PLC

(57) ABSTRACT

An object of the present disclosure is to provide a technology that makes it possible that a plurality of users use a vehicle that does not have a specified regular driver. An information processing apparatus determines whether or not after a first user moves to a destination place by driving a first vehicle, a second user is able to move by driving the first vehicle from the destination place of the first user as a departure place. If an affirmative determination is made in the determining, the information processing apparatus matches the first user and the second user with the first vehicle.

8 Claims, 11 Drawing Sheets

USER INFORMATION

| USER ID | DEPARTURE PLACE | DESTINATION PLACE | SCHEDULED DATE AND TIME OF DEPARTURE | SCHEDULED DATE AND TIME OF ARRIVAL | DRIVING AVAILABILITY INFORMATION |
|---|---|---|---|---|---|
| ID1001 | PLACE A | PLACE B | 20XX.07.01 6:00 | 20XX.07.01 8:00 | AVAILABLE |
| ID1002 | PLACE B | PLACE C | 20XX.07.01 8:00 | 20XX.07.01 10:00 | AVAILABLE |
| ID1003 | PLACE B | PLACE D | 20XX.07.01 8:00 | 20XX.07.01 13:00 | NOT AVAILABLE |
| ID1004 | PLACE B | PLACE E | 20XX.07.01 5:00 | 20XX.07.01 9:00 | AVAILABLE |
| ... | ... | ... | ... | ... | ... |

Fig. 5

FIRST MATCHING INFORMATION

| VEHICLE ID | FIRST USER ID | SECOND USER ID | TAKEOVER PLACE | TAKEOVER DATE AND TIME |
|---|---|---|---|---|
| ID200V | ID1001 | ID1002 | PLACE B | 20XX.07.01 AM 8:00 |

Fig. 6

SECOND MATCHING INFORMATION

| VEHICLE ID | FIRST USER ID | THIRD USER ID | RIDE PLACE OF THIRD USER | RIDE DATE AND TIME OF THIRD USER |
|---|---|---|---|---|
| ID200V | ID1001 | ID1005 | PLACE A | 20XX.07.01 6:00 |

Fig. 9

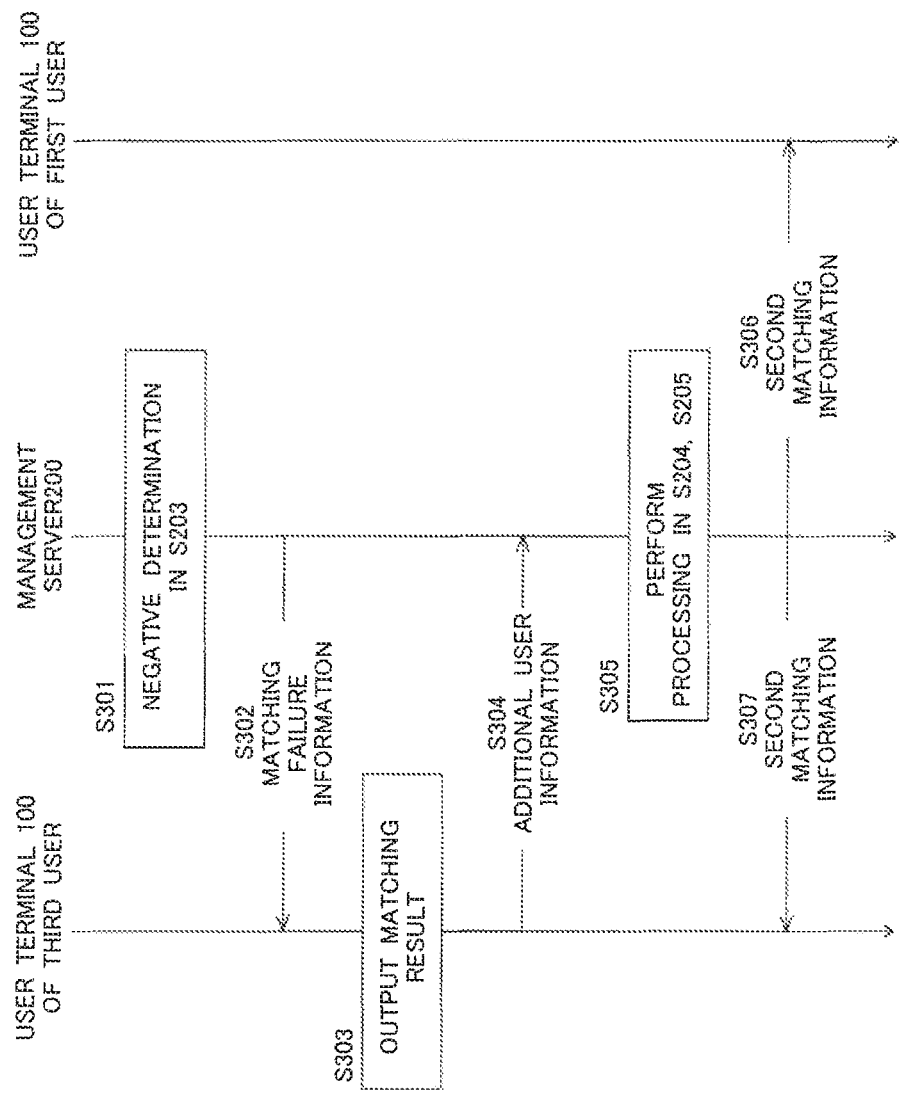

INFORMATION PROCESSING APPARATUS, INFORMATION PROCESSING METHOD, AND NON-TRANSIENT STORAGE MEDIUM

CROSS REFERENCE TO THE RELATED APPLICATION

This application claims the benefit of Japanese Patent Application No. 2018-126204, filed on Jul. 2, 2018, which is hereby incorporated by reference herein in its entirety.

BACKGROUND

Technical Field

The present disclosure relates to an information processing apparatus, an information processing method, and a non-transient storage medium.

Description of the Related Art

In recent years, use of so-called ride sharing, which is a form of travel in which a plurality of users share a ride in a same vehicle, has been spreading. For the use of such ride sharing, technologies for matching a plurality of users have been developed.

Patent Document 1 discloses a technology for determining whether or not owners of individual terminals share a ride in a same vehicle.

CITATION LIST

Patent Document

[Patent document 1] Japanese Patent Laid-Open No. 2011-237842

SUMMARY

An object of the present disclosure is to provide a technology for making it possible that a plurality of users use a vehicle that does not have a specified regular driver.

An information processing apparatus according to a first aspect of the present disclosure may comprise a control unit configured to perform acquiring user information on a first user and a second user, including a departure place, a destination place, and a travel schedule, determining, based on the user information, whether or not after the first user moves to the destination place by driving a first vehicle, the second user is able to move by driving the first vehicle from the destination place of the first user as the departure place, and if an affirmative determination is made in the determining, matching the first user and the second user with the first vehicle.

An information processing method according to a second aspect of the present disclosure is an information processing method executed by a computer, wherein the information processing method may comprise the steps of: acquiring user information on a first user and a second user, including a departure place, a destination place, and a travel schedule; determining, based on the user information, whether or not after the first user moves to the destination place by driving a first vehicle, the second user is able to move by driving the first vehicle from the destination place of the first user as the departure place; and if an affirmative determination is made in the step of determining, matching the first user and the second user with the first vehicle.

A non-transient storage medium according to a third aspect of the present disclosure may store therein a program causing a computer to perform the steps of: acquiring user information on a first user and a second user, including a departure place, a destination place, and a travel schedule; determining, based on the user information, whether or not after the first user moves to the destination place by driving a first vehicle, the second user is able to move by driving the first vehicle from the destination place of the first user as the departure place; and if an affirmative determination is made in the step of determining, matching the first user and the second user with the first vehicle.

According to the present disclosure, it is possible that a plurality of users use a vehicle that does not have a specified regular driver.

BRIEF DESCRIPTION OF THE DRAWINGS

FIG. 5 illustrates an example of a table structure of user information stored in a user information DB;

FIG. 6 illustrates an example of a table structure of first matching information stored in a first matching information DB;

FIG. 9 illustrates an example of a table structure of second matching information stored in a second matching information DB;

FIG. 11 is a diagram for describing operations in the information processing system, in a third embodiment.

DESCRIPTION OF THE EMBODIMENTS

An information processing apparatus according to a first aspect of the present disclosure may include a control unit that matches a first user and a second user with the same vehicle. Here, each of the first user and the second user is a user who can serve as a driver of a vehicle. Note that it can be determined whether or not a user can serve as a driver of a vehicle, by acquiring from each user, information about whether or not the user can serve as a driver of a vehicle.

The control unit may determine whether or not after the first user moves to a destination place by driving a first vehicle, the second user is able to move by driving the first vehicle, with the destination place of the first user as a departure place. The determination can be performed, for example, by acquiring user information on the first user and the second user, including a departure place, a destination place, and a travel schedule.

If an affirmative determination may be made in the above-described determination, that is, if it is determined that after the first user moves to the destination place by driving the first vehicle, the second user is able to move by driving the first vehicle from the destination place of the first user as the departure place, the control unit matches the first user and the second user with the first vehicle. Note that "matching the first user and the second user with the first vehicle" means combining the first user and the second user with the first vehicle.

Here, if a user moves to a destination place by driving a vehicle that does not have a specified regular driver and thereafter if no driver exists who replaces the user to drive the vehicle, the vehicle will be left behind at the destination place. In such a situation where a vehicle is left behind, it is difficult for users to use the vehicle. However, if the first user and the second user who fulfill a condition as described above are matched with the first vehicle, which is the same vehicle, the first user moves to the destination place by driving the first vehicle and thereafter the second user can take over and drive the first vehicle. Accordingly, it is possible that the first user and the second user can use the same vehicle as drivers. Thus, it is possible that a plurality of users use a vehicle that does not have specified regular driver.

Hereinafter, specific embodiments of the present disclosure will be described based on drawings. Sizes, materials, shapes, relative positions, and the like of components described in the examples are not intended to limit the technical scope of the disclosure to such sizes, materials, shapes, relative position, and the like unless particularly stated.

<First Embodiment>

(System Outline)

Figure 1:
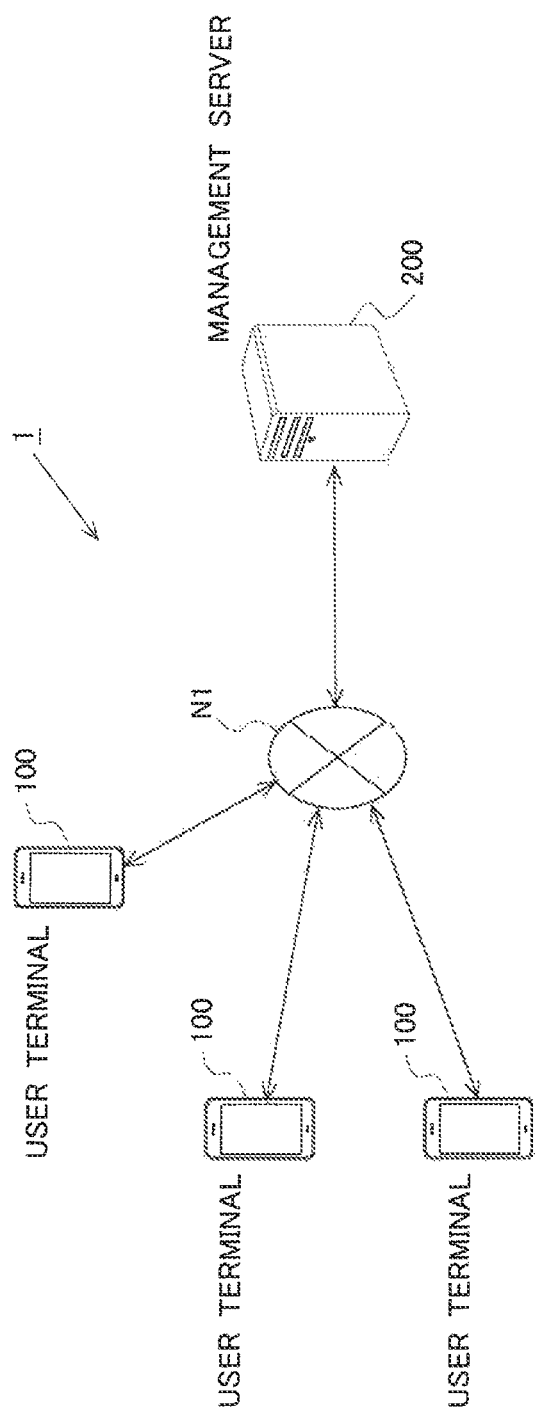
FIG. 1 illustrates a schematic configuration of an information processing system according to a first embodiment.

FIG. 1 illustrates a schematic configuration of an information processing system according to the present embodiment. An information processing system 1 includes user terminals 100 owned by users, respectively, and a management server 200. Note that as many user terminals 100 as users who use the information processing system 1 exist.

In the information processing system 1, each user terminal 100 and the management server 200 are mutually connected via a network N1. For the network N1, for example, a WAN (Wide Area Network) that is a worldwide public communication network, such as the Internet, or any other communication network may be used. The network N1 may include a telephone communication network, such as a mobile telephone network, and a wireless communication network, such as a Wi-Fi network.

A predetermined application for use of a matching service in the information processing system 1 is installed in each user terminal 100. Here, the matching service is a service that matches a plurality of users with a vehicle that does not have a specified regular driver and thereby enables the plurality of users to use the vehicle. Hereinafter, in the matching service, a vehicle that is used by a plurality of users will be referred to as a "rideshare vehicle" in some cases. Each user can register respective own information to use the matching service (hereinafter, referred to as "user information") with the management server 200 by operating the predetermined application on the user terminal 100.

The management server 200 is a server that manages the registered user information. The management server 200 performs first matching processing for providing the matching service, based on the registered user information. Here, the first matching processing is processing for matching a plurality of users who serve as rideshare vehicle drivers with the same vehicle, that is, processing for combining the plurality of users with the single vehicle. Note that details of the first matching processing will be described later. The management server 200 transmits a matching result obtained through the first matching processing to each user terminal 100.

(Hardware Configuration of the Server)

Figure 2:
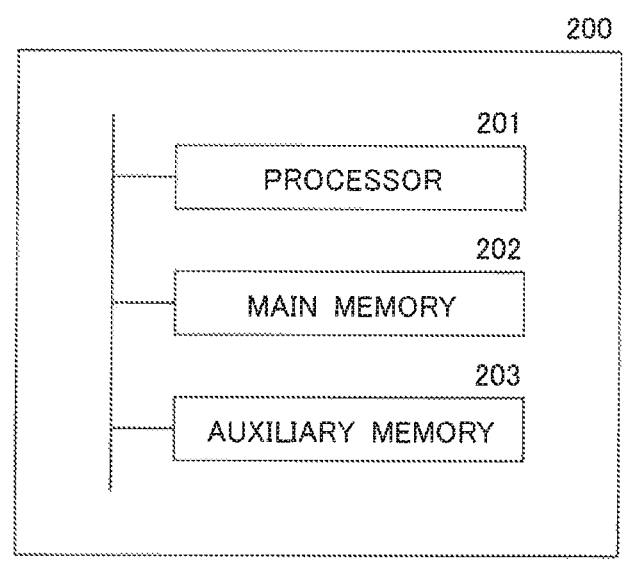
FIG. 2 illustrates part of a hardware configuration of a management server.

Here, a hardware configuration of the management server 200 will be described based on FIG. 2. FIG. 2 illustrates part of the hardware configuration of the management server 200. The management server 200 is made up of a general computer.

The management server 200 includes a processor 201 including a CPU, a DSP, car the like, a main memory 202 including a read-only memory (ROM), a random access memory (RAM), or the like, and an auxiliary memory 203 including an EPROM, a hard disk drive (HDD), a removable medium, or the like. Here, the removable medium is a flash memory such as a USB memory or an SD card, or a disc recording medium such as a CD-ROM, a DVD disc, or a Blu-ray Disc.

In the management server 200, the auxiliary memory 203 stores therein an operating system (OS), various programs, various information tables, and the like. In the management server 200, the processor 201 loads and executes each program stored in the auxiliary memory 203 on the main memory 202, whereby various function modules, which will be described later, can be implemented. However, part or all of the function modules of the management server 200 may be implemented by using a hardware circuit such as an ASIC or an FPGA. Note that the management server 200 is not necessarily implemented by using a single physical component, but may be made up of a plurality of mutually coordinating computers.

(System Configuration)

Figure 3:
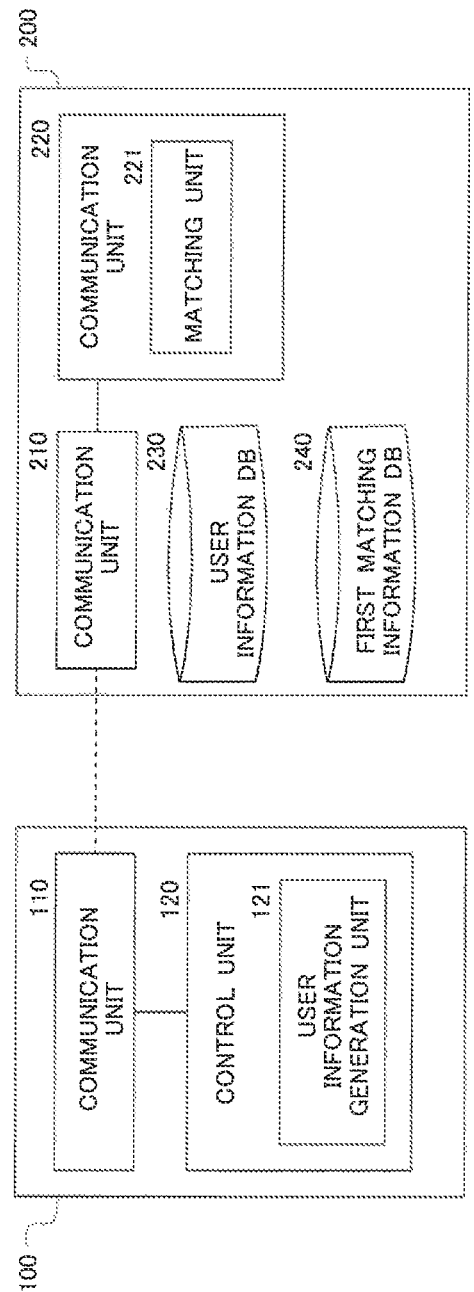
FIG. 3 is a block diagram schematically illustrating an example of respective configurations of a user terminal and the management server included in the information processing system according to the first embodiment.

Next, respective functional components of the user terminals 100 and the management server 200 included in the information processing system 1 according to the present embodiment will be described based on FIG. 3. FIG. 3 is a block diagram schematically illustrating an example of the respective configurations of one of the user terminals 100 and the management server 200 included in the information processing system 1 according to the present embodiment.

(User Terminal)

Each user terminal 100 includes a computer including a processor, a main memory, and an auxiliary memory. Examples of the user terminals 100 can include a smartphone, a tablet computer, a mobile computer, a wearable computer, a wireless storage, a mobile telephone, and a handy terminal. The user terminals 100 may be personal computers that are connected to the management server 200 via the network N1.

Each user terminal 100 includes a communication unit 110 and a control unit 120. The communication unit 110 is communication means for connecting the user terminal 100 to the network N1. The communication unit 110 can communicate with other apparatuses including the management server 200 via the network N1, for example, by using a mobile communication service such as 3G (3rd Generation) or LTE (Long Term Evolution).

The control unit 120 includes a function of performing arithmetic processing for controlling the user terminal 100. The control unit 120 can be implemented by a processor. Various function modules included in the control unit 120 can be implemented by the processor loading and executing each program stored in the auxiliary memory on the main memory.

Here, the control unit 120 includes a user information generation unit 121 as a function nodule. The user information generation unit 121 generates user information, based on an input operation made by a user on an input/output unit (for example, a touch panel display) of the user terminal 100 after the user activates the above-described predetermined application.

Here, the user information includes information about a departure place (that is, a scheduled ride place where the user rides in a rideshare vehicle), a destination place (that is, a scheduled drop-off place where the user drops off the rideshare vehicle), a scheduled date and time of departure from the departure place, and a scheduled date and time of arrival at the destination place of the user. Note that the information about the scheduled date and time of departure from the departure place and the scheduled date and time of arrival at the destination place may be information about a travel schedule for a time when the user moves from the departure place to the destination place by driving a vehicle. Accordingly, for example, the scheduled date and time of arrival at the destination place may be a date and time estimated based on the departure place, the destination place, and the scheduled date and time of departure. A scheduled time period of travel to be made by a vehicle from the departure place to the destination place may be included in the user information instead of the scheduled date and time of arrival at the destination place.

The user information also includes driving availability information, which is information about whether or not the user can serve as a driver of a rideshare vehicle when the user rides in the rideshare vehicle. That is, the user indicates an intention as to whether or not the user can serve as a driver of the rideshare vehicle, through an input operation on the input/output unit of the user terminal 100. Based on the intention indicated by the user, the user information generation unit 121 generates the driving availability information included in the user information on the user.

The control unit 120 performs processing for transmitting the user information generated by the user information generation unit 121 to the management server 200 via the communication unit 110. The control unit 120 performs processing for receiving first matching information, which is information about a matching result transmitted from the management server 200, via the communication unit 110. The control unit 120 performs processing for outputting the first matching information received from the management server 200 to the input/output unit of the user terminal 100.

(Management Server)

The management server 200 receives the user information from each user terminal 100 via the network N1. The management server 200 performs the first matching processing based on the received user information on each user. The management server 200 transmits the first matching information, which is information on a matching result obtained through the first matching processing, to each user terminal 100.

The management server 200 includes a communication unit 210, a control unit 220, a user information database (user information DB) 230, and a first matching information database (first matching information DB) 240. The communication unit 210 is communication means for connecting the management server 200 to the network N1. The communication unit 210 includes, for example, a LAN (Local Area Network) interface board and a wireless communication circuit for wireless communication.

The user information DB 230 is a database that stores therein the user information on each user. More specifically, in the user information DB 230, the user information received from each user terminal 100 is stored in association with each user. The first matching information DB 240 is a database that stores therein the first matching information. More specifically, in the first matching information DB 240, information about a plurality of users who are matched with the same rideshare vehicle through the first matching processing is stored in association with the rideshare vehicle.

The user information DB 230 and the first matching information DB 240 are constructed in the auxiliary memory 203 by a database management system program being executed by the processor 201 of the management server 200. The user information DB 230 and the first matching information DB 240 are, for example, relational databases.

The control unit 220 includes a function of performing arithmetic processing for controlling the management server 200. The control unit 220 can be implemented by the processor 1. The control unit 220 performs processing for receiving the user information transmitted from each user terminal 100 via the communication unit 210 and processing for transmitting the first matching information to each user terminal 100 via the communication unit 210. The control unit 220 performs information management processing such as registration of the user information in the user information DB 230 and registration of the first matching information with the first matching information DB 240. The control unit 220 includes a matching unit 221, which is a function module that performs the first matching processing.

Note that in the present embodiment, the management server 200 corresponds to the "information processing apparatus" according to the first aspect of the present disclosure.

(First Matching Processing)

Here, details of the first matching processing performed by the matching unit 221 will be described. As described above, a rideshare vehicle according to the present embodiment is a vehicle that does not have a specified regular driver and is a vehicle driven by a user who can serve as a driver. Therefore, when a first user that is a user who can serve as a driver moves to a destination place of the first user by driving a first vehicle that is a rideshare vehicle, the first vehicle will be left behind if no user other than the first user exists who drives the first vehicle from the destination place. Accordingly, in the first matching processing according to the present embodiment, the first user who moves to the destination place by driving the first vehicle and a second user who moves by driving the first vehicle from the destination place of the first user as a departure place are matched with the first vehicle.

Figure 4:
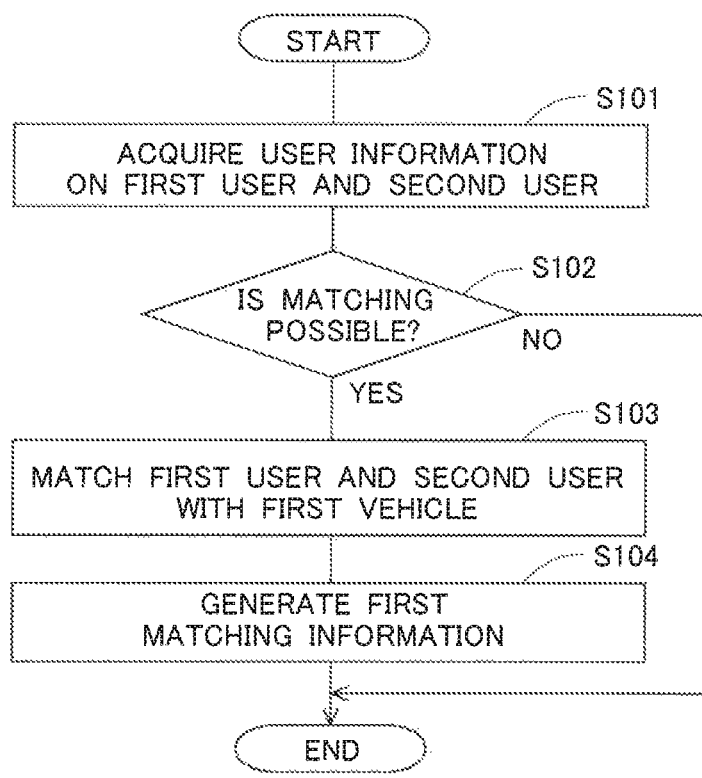
FIG. 4 is a flowchart illustrating a flow of first matching processing.

FIG. 4 is a flowchart illustrating a flow of the first matching processing performed by the matching unit 221. FIG. 5 illustrates an example of a table structure of the user information stored in the user information DB 230. FIG. 6 illustrates an example of a table structure of the first matching information stored in the first matching information DB 240. Note that the first matching processing is performed by comparing the user information stored in the user information DB 230 with each other. However, FIG. 4 illustrates processing performed for a combination of the user information on two users (one first user and one second user). Therefore, the matching unit 221 performs the processing illustrated in FIG. 4 for each combination of the user information on one user stored in the user information DB 230, regarded as the user information on the first user, and each piece of the user information other than the user information on the first user stored in the user information DB 230, regarded as the user information on the second user.

Here, it is assumed that the first matching processing is performed on a premise that the user information from each user terminal 100 has been received and an enough amount of the user information is stored in the user information DB 230.

In the flow illustrated in FIG. 4, first in S101, the user information on the first user and the second user, each of whom can serve as a driver of a rideshare vehicle, is acquired from the user information on a plurality of users stored in the user information DB 230. Here, as illustrated in FIG. 4, a user information tale stored in the user information DB 230 includes a user ID field, a departure place field, a destination place field, a scheduled date and time of departure field, a scheduled date and time of arrival field, and a driving availability information field.

In the user ID field, a user ID, which is identification information for identifying a user, is inputted. In the departure place field, information about a departure place included in the user information received from each user terminal 100 inputted. In the destination place field, information about a destination place included in the user information received from each user terminal 100 is inputted. In the scheduled date and time of departure field, information about a scheduled date and time of departure from the departure place included in the user information received from each user terminal 100 is inputted. In the scheduled date and time of arrival field, information about a scheduled date and time of arrival at the destination place included in the user information received from each user terminal 100 is inputted.

In the driving availability information field, driving availability information included in the user information received from each user terminal 100 is inputted. More specifically, if a user corresponding to a user ID associated with the driving availability information can serve as a driver of a rideshare vehicle, "available" is inputted in the driving availability information field. If a user corresponding to a user ID associated with the driving availability information is unable to serve as a driver of a rideshare vehicle, "not available" is inputted in the driving availability information field. Accordingly, for example, in the example of the user information table illustrated in FIG. 5, respective users corresponding to user IDs "ID 1001", "ID 1002", and "ID 1004" for which "available" is inputted in the driving availability information field are users who can serve as a driver of a rideshare vehicle. In the example of the user information table illustrated in FIG. 5, a user corresponding to a user ID "ID 1003" for which "not available" is inputted in the driving availability information field is a user who is unable to serve as a driver of a rideshare vehicle.

In S101 of the flow illustrated in FIG. 4, the user information related to the user IDs for which "available" is inputted in the driving availability information field is extracted as the user information on the first user and the second user.

Next in S102, it is determined whether or not it is possible to match the first user and the second user with the same rideshare vehicle, based on the user information on the first user and the second user acquired in S101. That is, in S102, it is determined whether or not after the first user moves to the destination place by driving the first vehicle, the second user is able to move by driving the first vehicle from the destination place of the first user as the departure place.

More specifically, in S102, it is determined whether or not conditions (1) and (2) below are fulfilled
(1) The destination place of the first user is the same as the departure place of the second user.

(2) The scheduled date and time of departure from the departure place of the second user is not earlier than the scheduled date and time of arrival at the destination place of the first user.

If the above conditions (1) and (2) are fulfilled, it can be determined that after the first user moves to the destination place by driving the first vehicle, the second user is able to move by driving the first vehicle from the destination place of the first user as the departure place. Note that a restriction may be added that confines a difference between the scheduled date and time of arrival at the destination place of the first user and the scheduled date and time of departure from the departure place of the second user within a predetermined limit. By adding such restriction, the first vehicle can be smoothly taken over from the first user to the second user.

Here, for example, in the example of the user information table illustrated in FIG. 5, the destination place of the user ID "ID 1001" is the same as the departure place of the user ID "ID 1002". Moreover, the scheduled date and time of arrival of the user ID "ID 1001" is the same as the scheduled date and time of departure of the user ID "ID 1002". Accordingly, if the user ID "ID 1001" is regarded as the first user and the user ID "ID 1002" is regarded as the second user, the above-mentioned conditions (1) and (2) are fulfilled. Therefore, in such a case, it is determined in S102 that it is possible to match the first user and the second user with the same rideshare vehicle. In the example of the user information table illustrated in FIG. 5, the destination place of the user ID "ID 1001" is also the same as the departure place of the user ID "ID 1004". However, the scheduled date and time of departure of the user ID "ID 1004" is earlier than the scheduled date and time of arrival of the user ID "ID 1001". Accordingly, if the user ID "ID 1001" is regarded as the first user and the user ID "ID 1004" is regarded as the second user, the above-mentioned condition (1) is fulfilled, but the above-mentioned condition (2) is not fulfilled. Therefore, in such a case, it is determined in S102 that it is impossible to match the first user and the second user with the same rideshare vehicle.

If an affirmative determination is made in S102, next in S103, the first user and the second user are matched with the first vehicle, which is the same rideshare vehicle. In such a case, each of the first user and the second user is matched with the first vehicle as a driver of the first vehicle. Next in S104, the first matching information indicating a matching result obtained through the first matching processing is generated. The first matching information generated here is transmitted to the respective user terminals 100 of the first user and the second user and is also registered with the first matching information DB 240.

As illustrated in FIG. 6, the first matching information table stored in the first matching information DB 240 includes a vehicle ID field, a first user ID field, a second user ID field, a takeover place field, and a takeover date and time field. In the vehicle ID field, a vehicle ID, which is identification information for identifying the first vehicle with which the first user and the second user are matched in S103, is inputted. In the first user ID field, the user ID of the first user matched with the first vehicle in S103 is inputted. In the second user ID field, the user ID of the second user matched with the first vehicle in S103 is inputted.

In the takeover place field, information about a place where the first vehicle is to be taken over between the first user and the second user, that is, a place that is the destination place of the first user and also is the departure place of the second user, is inputted. In the takeover date and time field, information about a date and time when the first vehicle is to be taken over between the first user and the second user is inputted. The takeover date and time may be set as a time period from the scheduled date and time of arrival of the first user until the scheduled date and time of departure of the second user.

Note that there are some cases where an affirmative determination is not obtained in S102 even if the processing illustrated in FIG. 4 is repeatedly performed while the second user is changed from one to another for the one first user. In such a case, it can be determined that no second user exits who can be matched with the same rideshare vehicle as the first user. In such a case, if the first user is matched with the first vehicle and the first user moves to the destination place by using the first vehicle, a result is that the first vehicle is left behind at the destination place thereafter. Accordingly, in such a case, the matching unit 221 generates information indicating that no matching is established because no one exists who can be matched with the same vehicle. The control unit 220 transmits the information indicating that no matching is established to the user terminal 100 of the first user via the communication unit 210. Thus, is not to the first user that the rideshare vehicle is unavailable because no matching is established.

As described above, according to the present embodiment, the first user and the second user who make it possible that after the first user moves to the destination place by driving the first vehicle, the second user takes over and drives the first vehicle are matched with the first vehicle. Thus, the first user and the second user can use the same rideshare vehicle as drivers. Hence, it is possible that a plurality users use a rideshare vehicle that does not have a specified regular driver.

Note that in S102 of the flow of the first matching processing illustrated in FIG. 4, if the above-mentioned conditions (1) and (2) are fulfilled in the user information on the first user and the second user registered with the user information DB 230, it is determined that it is possible to match the first user and the second user with the same rideshare vehicle. However, for example, if the destination place of the first user and the departure place of the second user are different in the user information registered with the user information DB 230, a notification indicating that may be sent to at least one of the first user and the second user from the management server 200. If the first user changes the destination place and/or the second user changes the departure place after receiving the notification and resultantly the second user becomes able to move by driving the first vehicle from the destination place of the first user as the departure place after the first user moves to the destination place by driving the first vehicle, it may be determined that it is possible to match the first user and the second user with the same rideshare vehicle.

Moreover, for example, if the scheduled date and time of arrival at the destination place of the first user is later than the scheduled date and time of departure from the departure place of the second user in the user information registered with the user information DB 230, a notification indicating that may be sent to at least one of the first user and the second user from the management server 200. If the first user changes the scheduled date and time of arrival at the destination place and/or the second user changes the scheduled date and time of departure from the departure place after receiving the notification and resultantly the second user becomes able to move by driving the first vehicle from the destination place of the first user as the departure place after the first user moves to the destination place by driving the first vehicle, may be determined that it is possible to match the first user and the second user with the same rideshare vehicle.

Figure 7:
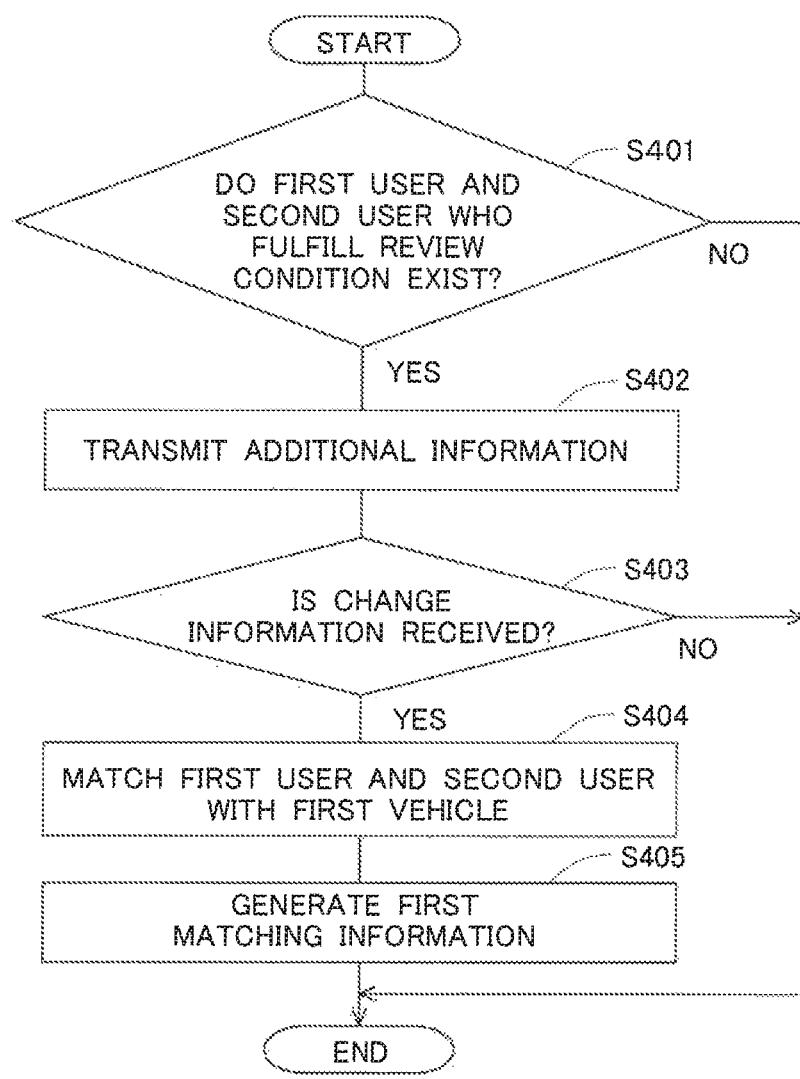
FIG. 7 is a flowchart illustrating a flow of review processing.

Here, review processing will be described based on FIG. 7. The review processing is performed to review matching, with respect to a user for which it is determined in the Above-described first matching processing that no matching is established because no one exists who can be matched with the same vehicle. FIG. 7 is a flowchart illustrating a flow of the review processing performed by the matching unit 221.

In the review processing, first in S401, it is determined whether or not the first user and the second user who fulfill a review condition exist among users for which it is determined in the above-described first matching processing that matching is impossible. For example, with respect to the first user and the second user for which it is determined in S102 of the flow of the first matching processing illustrated in FIG. 4 that matching is impossible because the above-mentioned condition (1) is not fulfilled although the above-mentioned condition (2) is fulfilled, if the destination place of the first user and the departure place of the second user are located within a predetermined range, it may be determined that the first user and the second user fulfill the review condition. For example, with respect to the first user and the second user for which it is determined in S102 of the flow of the first matching processing illustrated in FIG. 4 that matching is impossible because the above-mentioned condition (2) is not fulfilled although the above-mentioned condition (1) is fulfilled, if a difference between the scheduled date and time of arrival at the destination place of the first user and the scheduled date and time of departure from the departure place of the second user is within a predetermined time period, it may be determined that the first user and the second user fulfill the review condition. If a negative determination is made in S401, performing of the review processing is terminated.

If an affirmative determination is made in S401, then in S402, information indicating that no matching is established in a current state and additional information for prompting to make a change to the user information are transmitted to the respective user terminals 100 of the first user and the second user. At the time, if it is determined in S401 that the review condition is fulfilled because the destination place of the first user and the departure place of the second user are located within the predetermined range, information about the departure place of the second user is transmitted to the user terminal 100 of the first user, and information about the destination place of the first user is transmitted to the user terminal 100 of the second user. Thus, it is notified to the first user that the second user exits who has the departure place that is different from the destination place of the first user but is located within the predetermined range from the destination place. It is notified to the second user that the first user exits who has the destination place that is different from the departure place of the second user but is located within the predetermined range from the departure place. After receiving the notifications, if the first user changes the own destination place to the departure place of the second user, or if the second user changes the own departure place to the destination place of the first user, it becomes possible that after the first user moves to the destination place by driving the first vehicle, the second user moves by driving the first vehicle from the destination place of the first user as the departure place.

If it is determined in S401 that the review condition is fulfilled because a difference between the scheduled date and time of arrival at the destination place of the first user and the scheduled date and time of departure from the departure place of the second user is within the predetermined time period, information about the scheduled date and time of departure from the departure place of the second user is transmitted to the user terminal 100 of the first user, and information about the scheduled date and time of arrival at the destination place of the first user is transmitted to the user terminal 100 of the second user. Thus, it is notified to the first user that the second user exists who has the scheduled date and time of departure that is earlier than the scheduled date and time of arrival of the first user but the difference is within the predetermined time period. It is notified to the second user that the first user exists who has the scheduled date and time of arrival that is later than the scheduled date and time of departure of the second user but the difference is within the predetermined time period. After receiving the notifications, if the first user changes the own scheduled date and time of arrival to a date and time not later than the scheduled date and time of departure of the second user, or if to second user changes the own scheduled date and time of departure to a date and time not earlier than the scheduled date and time of arrival of the first user, it becomes possible that after the first user moves to the destination place by driving the first vehicle, the second user moves by driving the first vehicle from the destination place of the first user as the departure place.

Note that in S402, the additional information is not necessarily transmitted to both the user terminals 100 of the first user and the second user. That is, the additional information may be transmitted to any one of the user terminals 100 of the first user and the second user. In such a case, of the first user and the second user, the user owning the user terminal 100 that receives the additional information is prompted to make a change to the user information.

Next in S403, it is determined whether or not change information indicating that a change is made to the user information is received from the user terminal 100 of the first user or the user terminal 100 of the second user. The change information then received is, for example, information indicating that the first user has changed the own destination place to the departure place of the second user, or information indicating that the second user has changed the own departure place to the destination place of the first user. Moreover, the change information then received is, for example, information indicating that the first user has changed the own scheduled date and time of arrival to a date and time not later than the scheduled date and time of departure of the second user, or information indicating that the second user has changed the own scheduled date and time of departure to a date and time not earlier than the scheduled date and time of arrival of the first user.

If a negative determination is made in S403, the state where no matching of the first user and the second user is established continues. Accordingly, performing of the review processing is terminated. If an affirmative determination is made in S403, that is, if the change information as described above is received, both the above-mentioned conditions (1) and (2) are fulfilled. Accordingly, it can be determined that it becomes possible to match the first user and the second user with the same rideshare vehicle. Therefore, in such a case, next in S404, the first user and the second user are matched with the first vehicle, which is the same rideshare vehicle. Next in S405, the first matching information indicating a matching result obtained through the review processing is generated. The first matching information generated here is transmitted to the respective user terminals 100 of the first user and the second user and is also registered with the first matching information DB 240.

<Second Embodiment>

In the present embodiment, the management server 200 performs second matching processing as processing for providing a matching service, in addition to the above-described first matching processing. Here, the second matching processing is processing for matching another user to become a passenger with a rideshare vehicle with which a user to become a driver is matched.

Figure 8:
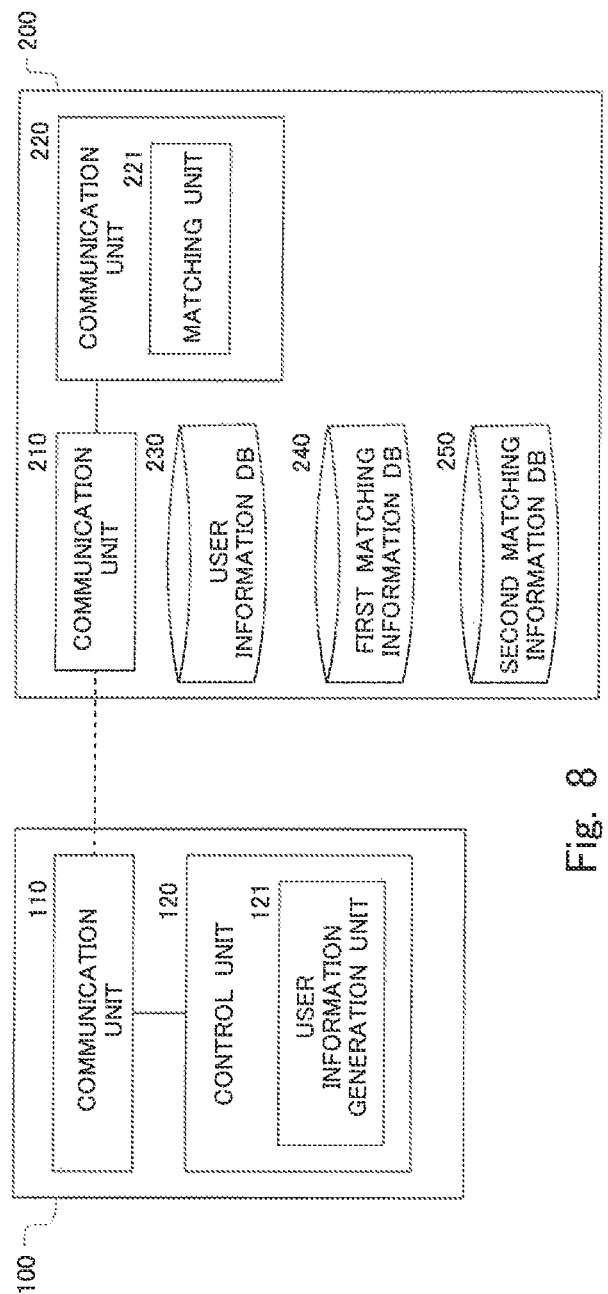
FIG. 8 illustrates a schematic configuration of an information processing system according to a second embodiment.

FIG. 8 is a block diagram schematically illustrating part of respective configurations of a user terminal 100 and a management server 200 included in an information processing system 1 according to the present embodiment. In the present embodiment, the management server 200 includes a second matching information database (second matching information DB) 250 in addition to the user information DB 230 and the first matching information DB 240. The second matching information DB 250 is a database that stores therein second matching information, which is information about a matching result obtained through the second matching processing.

In the present embodiment, the matching unit 221 in the control unit 220 performs the second matching processing, in addition to the first matching processing. The control unit 220 performs processing for transmitting the second matching information to each user terminal 100 via the communication unit 210. The control unit 220 performs registration of the second matching information in the second matching information DB 250. Thus, in the second matching information DB 250, information about a plurality of users matched with the same rideshare vehicle through the second matching processing is stored in association with the rideshare vehicle. The second matching information DB 250 is constructed in the auxiliary memory 203 by a database management system program being executed by the processor 201 of the management server 200. The second matching information DB 250 is, for example, a relational database.

Note that in the present embodiment, the management server 200 also corresponds to the "information processing apparatus" according to the first aspect of the present disclosure.

(Second Matching Processing)

Here, details of the second matching processing performed by the matching unit 221 will be described. As described above, the second matching processing is processing for matching another user to become a passenger with a rideshare vehicle with which a user to become a driver is matched. Hereinafter, a user who is a candidate for a driver of a rideshare vehicle is referred to as a first user, and a user who is a candidate for a passenger of the rideshare vehicle driven by the first user will be referred to as a third user.

The second matching processing, similarly to the first matching processing, is also performed based on the user information stored in the user information DB 230. Here, if conditions (3) and (4) below are fulfilled in the user information on the first user and the third user, the third user can ride in the rideshare vehicle driven by the first user.

(3) A departure place and a destination place of the first user are the same as a departure place and a destination place of the third user.

(4) A scheduled date and time of departure from the departure place and a scheduled date and time of arrival at the destination place of first user are the same as a scheduled date and time of departure from the departure place and a scheduled date and time of arrival at the destination place of the third user.

Moreover, if conditions (5) and (6) below are fulfilled in the user information on the first user and the third user, the third user can also ride in the rideshare vehicle driven by the first user.

(5) The destination place of the first user is the same as the destination place of the third user, and the departure place of the third user is located on a travel route to be taken by the rideshare vehicle from the departure place to the destination place of the first user.

(6) The scheduled date and time of arrival at the destination place of the third user is not later than the scheduled date and time of arrival at the destination place of the first user, and a scheduled date and time when the rideshare vehicle driven by the first user arrives at the departure place of the third user is not later than the scheduled date and time of departure from the departure place of the third user.

Note that the "scheduled date and time when the rideshare vehicle driven by the first user arrives at the departure place of the third user" can be estimated based on the scheduled date and time of departure from the departure place of the first user, a distance from the departure place of the first user to the departure place of the third user, and the like.

Accordingly, in the second matching processing, if the above-mentioned conditions (3) and (4) are fulfilled or the above-mentioned conditions (5) and (6) are fulfilled in the user information on the first user and the third user, the third user is matched with the rideshare vehicle driven by the first user. The control unit 220 transmits the second matching information indicating a matching result obtained through the second matching processing to the respective user terminals 100 of the first user and the third user and also registers the second matching information with the second matching information DB 250.

FIG. 9 illustrates an example of a table structure of the second matching information stored in the second matching information DB 250. As illustrated in FIG. 9, a second matching information table stored in the second matching information DB 250 includes a vehicle ID field, a first user ID field, a third user ID field, a ride place of third user field, and a ride date and time of third user field. In the vehicle ID field, a vehicle ID, which is identification information for identifying a first vehicle with which the first user and the third user are matched (that is, a rideshare vehicle for which the first user is a driver and the third user is a passenger), is inputted. In the first user ID field, a user ID of the first user matched with the first vehicle is inputted. In the third user ID field, a user ID of the third user matched with the first vehicle is inputted.

In the ride place of third user field, information about a ride place where the third user rides in the first vehicle, that is, information about the departure place of the third user, is inputted. In the ride date and time of third user field, information about a date and time when the third user rides in the first vehicle, that is, information about the scheduled date and time of departure from the departure place of the third user, is inputted. Note that the ride place of the third user in the example of the second matching information table illustrated in FIG. 9 is the same as the departure place of the first user (user ID "ID 1001") in the example of the user information table illustrated in FIG. 5. The ride date and time of the third user in the example of the second matching information table illustrated in FIG. 9 is the same as the scheduled date and time of departure of the first user (user ID "ID 1001") in the example of the user information table illustrated in FIG. 5. This is because the above-mentioned conditions (3) and (4) are fulfilled and therefore the first user (user ID "ID 1001") and the third user (user ID "ID 1005") are matched.

Here, as described in the above first embodiment, there are some cases where after the first user moves to the destination place by driving the first vehicle, no second user exists who takes over and drives the first vehicle. That in the first matching processing, it is determined that no second user exists who is matched with the first vehicle together with the first user, in some cases. In such a case, the first user is unable to use the first vehicle. Consequently, the third user is not able to use the first vehicle either even if the third user can be matched with the first vehicle driven by the first user because the above-mentioned conditions (3) and (4) or the above-mentioned conditions (5) and (6) are fulfilled in the user information on the first user and the third user.

Accordingly, in the second matching processing according to the present embodiment, it is determined whether or not matching of the third user with the first vehicle driven by the first user is established, based on whether or not the second user exists who is matched with the first vehicle together with the first user. That is, if it is determined that it is possible to match the third user with the first vehicle driven by the first user based on the user information stored in the user information DB 230, and if the second user exists who is matched with the first vehicle together with the first user, matching of the third user with the first vehicle driven by the first user is established. Even if it is determined that it is possible to match the third user with the first vehicle driven by the first user based on the user information stored in the user information DB 230, but if no second user exists who is matched with the first vehicle together with the first user, matching of the third user with the first vehicle driven by the first user is not established.

Figure 10:
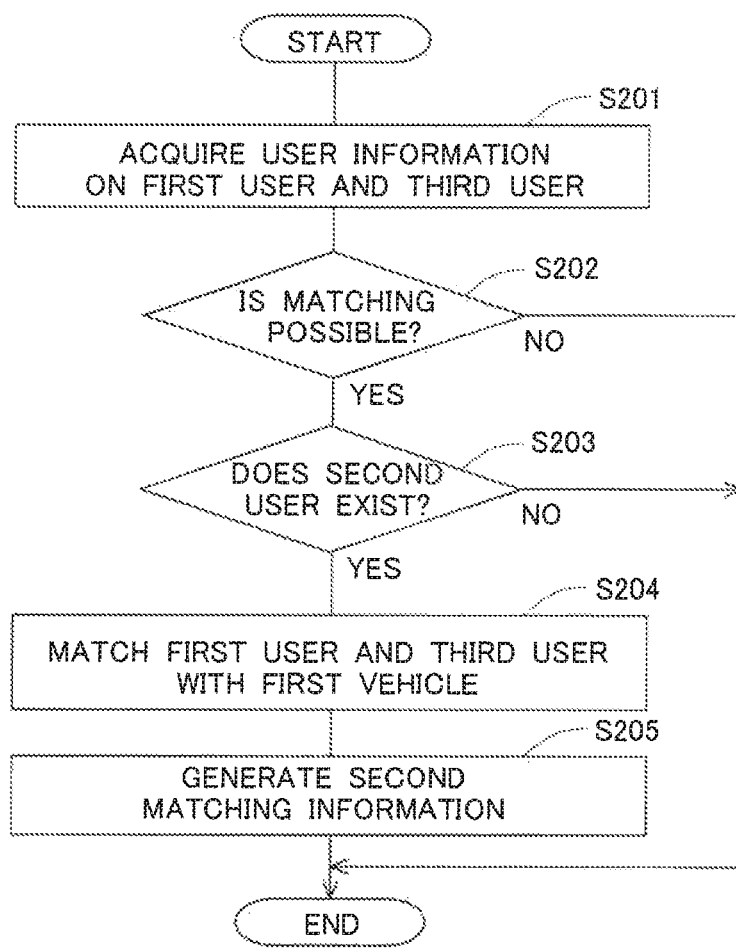
FIG. 10 is a flowchart illustrating a flow of second matching processing.

Hereinafter, a flow of the second matching processing performed by the matching unit 221 will be described based on FIG. 10. FIG. 10 is a flowchart illustrating the flow of the second matching processing. Note that the second matching processing is performed by comparing the user information stored in the user information DB 230 with each other. However, FIG. 10 illustrates processing performed for a combination of the user information on two users (one first user and one third user). Therefore, the matching unit 221 performs the processing illustrated in FIG. 10 for each combination of the user information on one user stored in the user information DB 230, regarded as the user information on the first user, and each piece of the user information other than the user information on the first user stored in the user information DB 230, regarded as the user information on the third user.

In the flow illustrated in FIG. 10, first in S201, the user information on the first user and the third user is acquired from the user information on a plurality of users stored in the user information DB 230. Here, the user information on the first user is the user information on a user who can serve as a driver of a rideshare vehicle, that is, the user information on a user for which "available" is inputted in the driving availability information field of the user information table. On the other hand, the user information on the third user is not limited to a user who can serve as a driver of a rideshare vehicle. That is, the user information on the third user is selected regardless of information inputted in the driving availability information field of the user information table.

Next in S202, based on the user information on the first user and the third user acquired in S201, it is determined whether or not it is possible to match the third user with the vehicle driven by the first user. That is, it is determined whether or not the third user can ride in the first vehicle driven by the first user. More specifically, in S202, it is determined whether or not the above-mentioned conditions (3) and (4) or the above-mentioned conditions (5) and (6) are fulfilled. In S202, an affirmative determination is made if the above-mentioned conditions (3) and (4) are fulfilled, or if the above-mentioned conditions (5) and (6) are fulfilled.

If an affirmative determination is made in S202, next in S203, it is determined whether or not the second user exists who is matched with the first vehicle together with the first user. The processing in S203 is performed based on the first matching information stored in the first matching information DB 240. More specifically in S203, it is determined whether or not the user ID of the first user, as the first user ID, is stored in the first matching information DB 240 in association with the vehicle ID of the first vehicle together with the second user ID.

If an affirmative determination is made in S203, next in S204, the first user and the third user are matched with the first vehicle, which is the same rideshare vehicle. In such a case, the first user is matched with the first vehicle as a driver of the first vehicle, and the third user is matched with the first vehicle as a passenger of the first vehicle. Next in S205, the second matching information indicating a matching result obtained through the second matching processing is generated. The second matching information generated here is transmitted to the respective user terminals 100 of the first user and the third user and is also registered with the second matching information DB 250.

Note that there are some cases where an affirmative determination is not obtained in S202 even if the processing illustrated in FIG. 10 is repeatedly performed while the first user is changed from one to another for the one third user. In such a case, it can be determined that no rideshare vehicle exists in which the third user can ride. Moreover, there are some cases where an affirmative determination is not obtained in S203 either even if the processing illustrated in FIG. 10 is repeatedly performed while the first user is changed from one to another for the one third user. In such a case, it can also be determined that no rideshare vehicle exists in which the third user can ride. Accordingly, in such cases, the matching unit 221 generates information indicating that no matching is established because no rideshare vehicle exists that can offer a ride. The control unit 220 transmits the information indicating that no matching is established to the user terminal 100 of the third user via the communication unit 210. Thus, it is notified to the third user that a rideshare vehicle is not available because no matching is established.

As described above, according to the present embodiment, if the first user moves to the destination place by driving the first vehicle because the second user exists who takes over the first vehicle after arriving at the destination place, the third user is matched as a passenger of the first vehicle driven by the first user. Thus, it is possible that the first user and the second user use the same rideshare vehicle as drivers, and that the third user uses the same rideshare vehicle as a passenger.

<Third Embodiment>

In the present embodiment, the management server 200 also performs the first matching processing and the second matching processing described above, as processing for providing a matching service. Here, "taking over driving of a rideshare vehicle (becoming a driver of a rideshare vehicle) after the first user moves to the destination place by driving the rideshare vehicle" will be referred to as "taking over driving" in some cases.

In the above-described second matching processing, if no second user exists who is matched with the first vehicle, which is a rideshare vehicle, together with the first user, matching of the third user with the first vehicle driven by the first user is not established. However, if the third user who rides in the first vehicle driven by the first user can take over driving, a situation where the first vehicle is left behind at the destination place of the first user can be avoided even if no second user exists who can take over driving.

Accordingly, in the present embodiment, if matching of the third user with the first vehicle driven by the first user is not established in the second matching processing because no second user exists who is matched with the first vehicle together with the first user, a result of the matching is notified to the third user. If the third user who has received the notification indicates an intention that the third user can serve as a driver of the first vehicle after moving to the destination place of first user by riding in the first vehicle, the management server 200 matches the first user and the third user with the first vehicle.

(System Operations)

FIG. 11 illustrates a flow of operations in the information processing system 1 when the second matching processing is performed by the matching unit 221 in the control unit 220 of the management server 200 in the present embodiment. In the present embodiment, if a negative determination is made in S203 of the flow of the second matching processing illustrated in FIG. 10 (S301), that is, if it is determined that no second user exists who is matched with the first vehicle together with the first user, matching failure information is transmitted from the management server 200 to the user terminal 100 of the third user (S302). The matching failure information is information indicating a matching result that matching of the third user with the first vehicle driven by the first user is not established because no second user exists who is matched with the first vehicle together with the first user.

When the matching failure information is received, the user terminal 100 of the third user outputs the matching result indicated by the matching failure information via the input/output unit (S303). As a result, if the third user performs, on the input/output unit of the own user terminal 100, an operation to input additional user information, which is information indicating that the third user can take over driving, the additional user information is transmitted from the user terminal 100 of the third user to the management server 200 (S304).

At the management server 200, when the additional user information is received, the matching unit 221 in the control unit 220 performs the processing in S204, S205 of the flow of the second matching processing illustrated in FIG. 10. That is, the first user and the third user are matched with the first vehicle, which is the same rideshare vehicle, and the second matching information indicating the matching result is generated. The second matching information is transmitted from the management server 200 to the respective user terminals 100 of the first user and the third user (S306, S307). Thus, it is notified to the first user and the third user that the rideshare vehicle becomes available because matching is established.

As described above, according to the present embodiment, even if no second user exists who can take over driving because the departure place of the second user is the same as the destination place of the first user, the first user and the third user are matched with the first vehicle if driving can be taken over by the third user who is a passenger of the first vehicle. Accordingly, it is possible to further promote use by a plurality of users of a rideshare vehicle that does not have a specified regular driver.

Note that in the present embodiment, the management server 200 also corresponds to the "information processing apparatus" according to the first aspect of the present disclosure.

(Other Embodiments)

The above-described embodiments are examples, and the present disclosure can be implemented with changes made as appropriate without departing from the gist of the present disclosure. The processing and units described in the present disclosure can be implemented by being freely combined unless technical conflicts arise.

Moreover, the processing described as processing to be performed by a single apparatus may be performed by a plurality of apparatuses in a shared manner. Alternatively, the processing described as processing to be performed by different apparatuses may be performed by a single apparatus. In a computer system, it can be flexibly changed which hardware component (server component) is used to implement each function.

The present disclosure can also be implemented by providing a computer program designed to implement the functions described in the above embodiments to a computer, and by one or more processors included in the computer reading and executing the program. Such a computer program may be provided to the computer by using a non-transient computer-readable storage medium that can be connected to a system bus of the computer, or may be provided to the computer via a network. Examples of the non-transient computer-readable storage medium include any types of disks/discs such as magnetic disks (floppy(R) disk, hard disk drive (HDD), and the like) and optical discs (CD-ROM, DVD disc, Blu-ray Disc, and the like), read-only memory (ROM), random access memory (RAM), EPROM, EEPROM, magnetic card, flash memory, optical card, and any type of media suitable for storing therein electronic instructions.

What is claimed is:

1. An information processing apparatus, comprising:
a control unit configured to perform:
acquiring user information on a first user and a second user, including a departure place, a destination place, and a travel schedule; and
determining, based on the user information, whether or not after the first user moves to the destination place by driving a first vehicle, the second user is able to move by driving the first vehicle from the destination place of the first user as the departure place,
wherein when the result of the determining is that the second user is able to move by driving the first vehicle from the destination place of the first user as the departure place, the control unit is further configured to perform matching the first user and the second user with the first vehicle to thereby allow the second user to take over and drive the first vehicle after the first user drives the first vehicle, and
wherein when the result of the determining is that there is no second user able to move by driving the first vehicle from the destination place of the first user as the departure place, the control unit is further configured to perform notifying the first user that the first vehicle is unavailable.

2. The information processing apparatus according to claim 1, wherein the control unit makes an affirmative determination in the determining and matches the first user and the second user with the first vehicle if the destination place of the first user is same as the departure place of the second user and if a scheduled date and time of departure from the departure place of the second user is not earlier than a scheduled date and time of arrival at the destination place of the first user, in the user information on the first user and the second user.

3. The information processing apparatus according to claim 1, wherein the control unit is configured to further perform
acquiring the user information on a third user in addition to the user information on the first user and the second user, and
if it is determined, based on the user information, that the third user exists who can ride in the first vehicle driven by the first user when the first user moves toward the destination place by driving the first vehicle,
establishing matching of the third user with the first vehicle driven by the first user if the second user exists who is matched with the first vehicle together with the first user, but not establishing matching of the third user with the first vehicle driven by the first user if the second user does not exist who is matched with the first vehicle together with the first user.

4. The information processing apparatus according to claim 3, wherein the control unit is configured to further perform
if matching of the third user with the first vehicle driven by the first user is not established because the second user does not exist who is matched with the first vehicle together with the first user, notifying a result of the matching to the third user, and
after notifying the result of the matching to the third user, if information indicating that the third user can serve as a driver of the first vehicle after the third user moves to the destination place of the first user by riding in the first vehicle is received, matching the first user and the third user with the first vehicle.

5. The information processing apparatus according to claim 2, wherein the control unit is configured to further perform
if the destination place of the first user and the departure place of the second user are different in the user information on the first user and the second user, sending a notification indicating that to at least one of the first user and the second user,
receiving information indicating that the first user has changed the destination place and/or information indicating that the second user has changed the departure place, after receiving the notification, and
as a result of the first user having changed the destination place and/or the second user having changed the departure place, if the second user becomes able to move by driving the first vehicle from the destination place of the first user as the departure place after the first user moves to the destination place by driving the first vehicle, matching the first user and the second user with the first vehicle.

6. The information processing apparatus according to claim 2, wherein the control unit is configured to further perform
if the scheduled date and time of arrival at the destination place of the first user is later than the scheduled date and time of departure from the departure place of the second user in the user information on the first user and the second user, sending a notification indicating that to at least one of the first user and the second user, receiving information indicating that the first user has changed the scheduled date and time of arrival at the destination place and/or information indicating that the second user has changed the scheduled date and time of departure from the departure place, after receiving the notification, and as a result of the first user having changed the scheduled date and time of arrival at the destination place and/or the second user having changed the scheduled date and time of departure from the departure place, if the second user becomes able to move by driving the first vehicle from the destination place of the first user as the departure place after the first user moves to the destination place by driving the first vehicle, matching the first user and the second user with the first vehicle.

7. An information processing method executed by a computer, comprising the steps of:

acquiring user information on a first user and a second user, including a departure place, a destination place, and a travel schedule;

determining, based on the user information, whether or not after the first user moves to the destination place by driving a first vehicle, the second user is able to move by driving the first vehicle from the destination place of the first user as the departure place;

when the result of the determining is that the second user is able to move by driving the first vehicle from the destination place of the first user as the departure place, matching the first user and the second user with the first vehicle to thereby allow the second user to take over and drive the first vehicle after the first user drives the first vehicle; and when the result of the determining is that there is no second user able to move by driving the first vehicle from the destination place of the first user as the departure place, notifying the first user that the first vehicle is unavailable.

8. A non transitory computer-readable storage medium storing a program causing a computer to perform:

acquiring user information on a first user and a second user, including a departure place, a destination place, and a travel schedule;

determining, based on the user information, whether or not after the first user moves to the destination place by driving a first vehicle, the second user is able to move by driving the first vehicle from the destination place of the first user as the departure place;

when the result of the determining is that the second user is able to move by driving the first vehicle from the destination place of the first user as the departure place, matching the first user and the second user with the first vehicle to thereby allow the second user to take over and drive the first vehicle after the first user drives the first vehicle; and when the result of the determining is that there is no second user able to move by driving the first vehicle from the destination place of the first user as the departure place, notifying the first user that the first vehicle is unavailable.

* * * * *